(12) United States Patent
Kwon et al.

(10) Patent No.: US 8,199,568 B2
(45) Date of Patent: Jun. 12, 2012

(54) METHOD AND APPARATUS FOR A DISK DAMPER INCLUDING AN ENCLOSING FLOW CHAMBER WALL FOR A HARD DISK DRIVE

(75) Inventors: Haesung Kwon, San Jose, CA (US); Jaesuk Lee, Suwon (KR); Seong-Woo Kang, San Jose, CA (US); Hyung Jai Lee, Cupertino, CA (US)

(73) Assignee: Seagate Technology International

( * ) Notice: Subject to any disclaimer, the term of this patent is extended or adjusted under 35 U.S.C. 154(b) by 597 days.

(21) Appl. No.: 12/359,155

(22) Filed: Jan. 23, 2009

(65) Prior Publication Data

US 2010/0188777 A1 Jul. 29, 2010

(51) Int. Cl.
*H01L 43/02* (2006.01)
*G11C 11/14* (2006.01)

(52) U.S. Cl. .................. 365/171; 257/421; 257/E43.001
(58) Field of Classification Search .................. None
See application file for complete search history.

(56) References Cited

U.S. PATENT DOCUMENTS 7,593,181 B1 * 9/2009 Tsay et al. ................. 360/97.03
2008/0084631 A1 * 4/2008 Chan et al. ................. 360/97.02

* cited by examiner

*Primary Examiner* — Hoai V Ho
*Assistant Examiner* — James G Norman

(57) ABSTRACT

A hard disk drive with a disk base including a disk wall with a first intake, a second intake off of the first intake, an outlet and an air filter configured to receive a first airflow from the first intake and suction from a second airflow from the second intake creating negative pressure at a trapping surface of the air filter away from the outlet. At least one disk rotates to create a rotating disk surface generating airflow configured to enter the first intake to create the first airflow. A disk damper includes an enclosing wall neighboring the air filter to create a flow chamber providing a third airflow through the outlet formed of the first air flow crossing the trapping surface and the second air flow. A disk cover mounts on the disk base to encapsulate the air chamber. The disk base and disk damper are disclosed.

6 Claims, 4 Drawing Sheets

METHOD AND APPARATUS FOR A DISK DAMPER INCLUDING AN ENCLOSING FLOW CHAMBER WALL FOR A HARD DISK DRIVE

TECHNICAL FIELD

The present invention relates to a disk damper both damping airflow induced vibration and improving the performance of a recirculation filter in a hard disk drive.

BACKGROUND OF THE INVENTION

Hard disk drives often have air-borne particle contaminants that can impede their performance, and to address this problem many hard disk drives contain one or two recirculation air filters that capture stray particles. Disk dampers have been used to dampen disk and head stack assembly vibrations due to flow-induced disturbance, but using disk damper to improve air filter performance is relatively unknown.

SUMMARY OF THE INVENTION

Embodiments of the invention include a hard disk drive comprising the following: A disk base with a disk wall comprising a first intake, a second intake off of the first intake, an outlet and an air filter configured to receive a first airflow from the first intake and suction created by a second airflow from the second intake to create a negative pressure across a trapping surface of the air filter opposite the outlet. A spindle motor mount on the disk base is coupled to at least one disk to create at least one rotating disk surface to generate an airflow configured to enter the first intake to create the first airflow. A disk damper is mounted on the disk base and includes an enclosing wall neighboring the air filter to encapsulate a flow chamber fed by the second air flow from and the second airflow having crossed the trapping surface to create a third airflow through the outlet. A disk cover mounted on the disk base further encapsulates the air chamber. This hard disk drive is configured to not only optimize the trapping of particles at the trapping surface of the air filter away from the outlet, but also to provide a disk damper with an extensive surface area near the disk surface to minimize mechanical vibrations on the disk.

The enclosing wall of the disk damper prevents particles from attaching onto the outlet side of the air filter. It also allows more mounting area for the disk dampers standing on the disk base to minimize tilting of disk damper towards the disks, resulting in improved shock performance in terms of disk to damper clearances.

DETAILED DESCRIPTION

This invention relates to hard disk drives including at least one air filter and at least one disk damper. Embodiments of the invention include a hard disk drive with at least one air filter mounted in a disk wall of the disk base and at least one disk dampers including an enclosing wall forming a flow chamber for trapping particles in the air in an air filter away from the enclosing wall.

Figure 1:
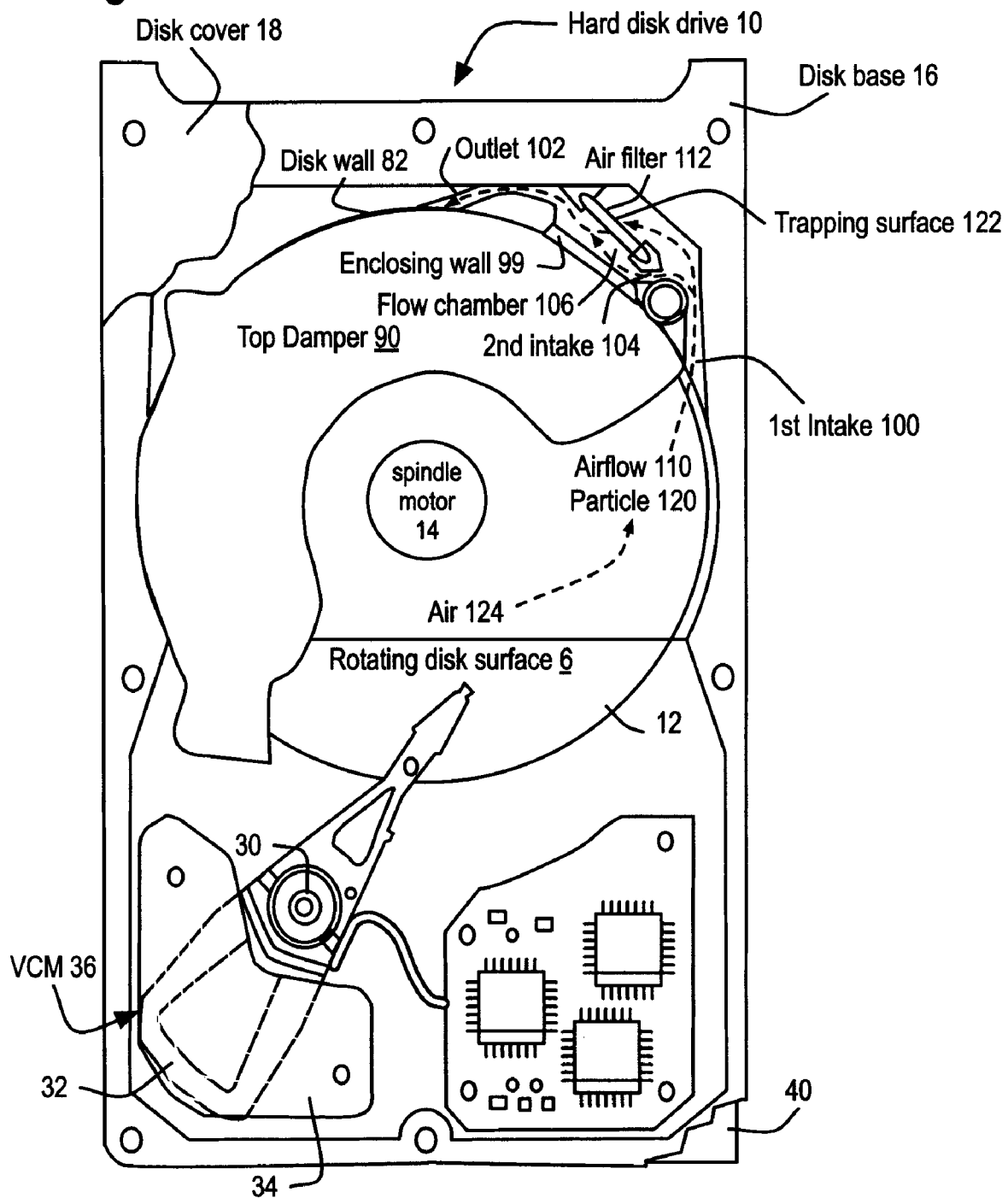
FIG. 1 shows an example embodiment of a hard disk drive that includes a disk base with a disk wall including a first intake, a second intake from the first intake, an air filter mounted to separate airflow between the first intake and the second intake and an outlet. A spindle motor is mounted on the disk base and coupled to rotate at least one disk in the disk cavity formed by the disk wall to create a rotating disk surface. Airflow off of the rotating disk surface enters into the first intake. The hard disk drive includes a top disk damper mounted on the disk base and including an enclosing wall forming a flow chamber between the air filter, the second intake and the outlet and a disk cover. The flow chamber is configured to create a negative pressure at a trapping surface of the air filter. The mounting area of the disk damper also improves the mechanical stability of the parallelism of the disk damper over the disk base to enhance shock performance of the hard disk drive.

Referring to the drawings more particularly by reference numbers, FIG. 1 shows an example embodiment of a hard disk drive 10 (with further details found in FIG. 2) comprising the following: A disk base 16 with a disk wall 82 comprising a first intake 100, a pedestal 108, a second intake 104 off of the first intake, an outlet 102 and an air filter 110 configured to receive a first airflow 112 from the first intake and suction from a second airflow 114 from the second intake providing a negative pressure across a trapping surface 122. A spindle motor 14 is mounted on the disk base and rotates at least one disk 12 to create at least one rotating disk surface 6 to generate airflow 110 for air that may contain a contaminant particle 120, with the airflow configured to enter the first intake to create the first airflow. A top disk damper 90 is mounted on the disk base and includes an enclosing wall 99 neighboring the air filter to create a flow chamber 106 between the air filter, the second intake and the outlet and a disk cover. The flow chamber 106 is configured to create a negative pressure at a trapping surface 122 of the air filter 112. A disk cover 18 is mounted on the disk base to further encapsulate the air chamber.

Figure 6:
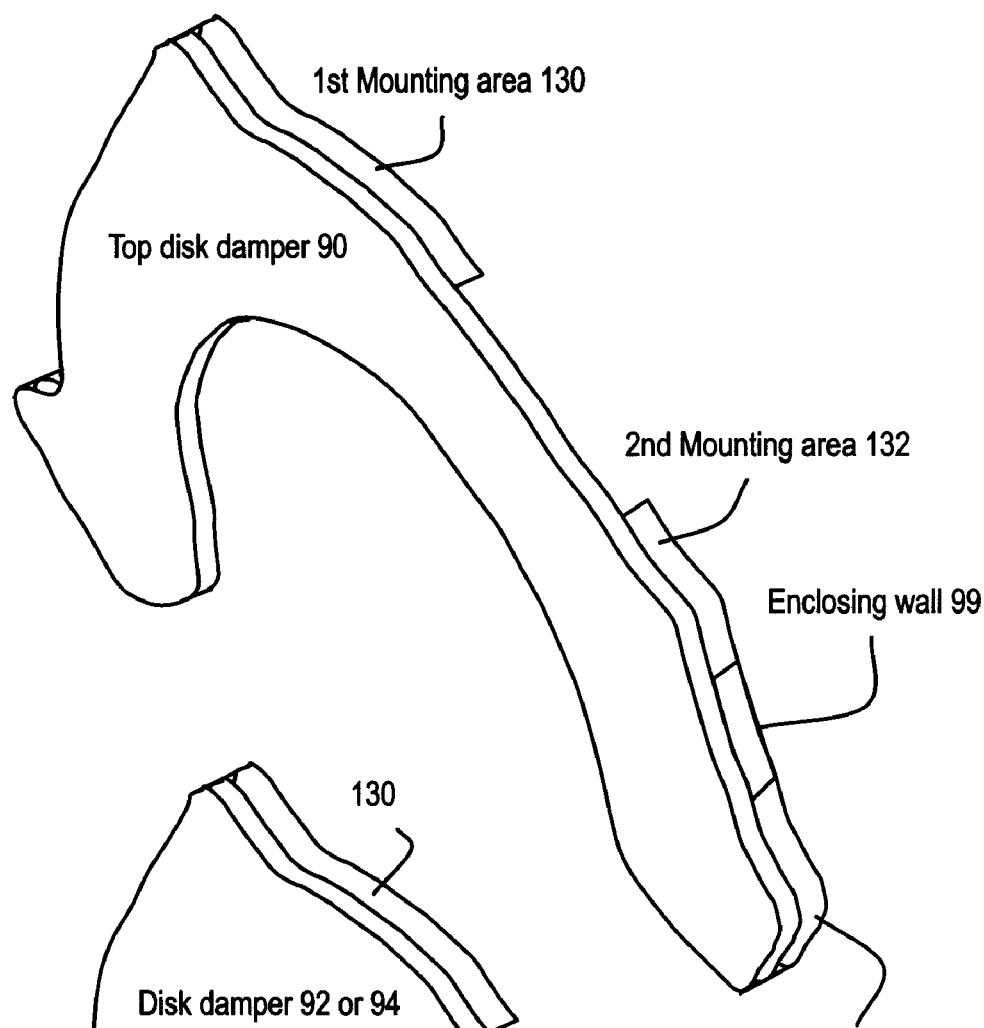
FIG. 6 shows an embodiment of the top disk damper including the enclosing wall with three mounting areas.
Figure 7:
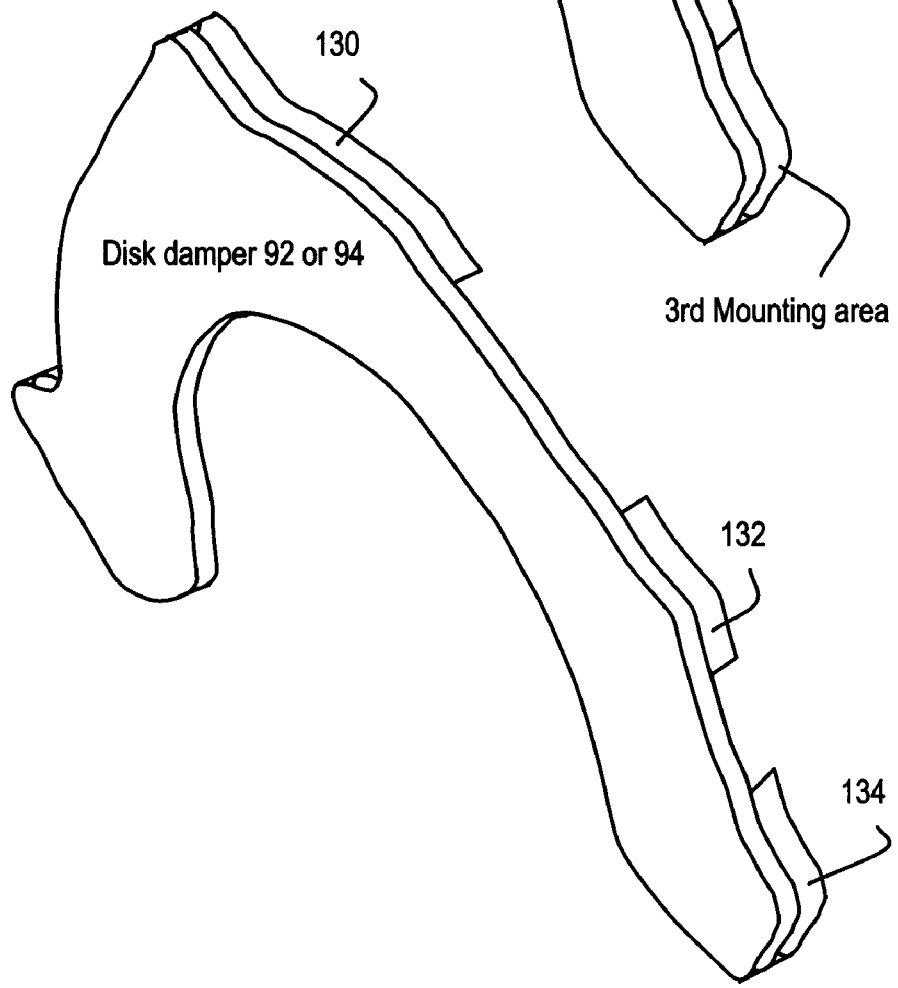
FIG. 7 shows an embodiment of the second or third disk damper without the enclosing wall but with the three mounting areas.

This hard disk drive 10 is configured to not only optimize the trapping of particles at the trapping surface 122 away from the outlet 116 but also to provide a top disk damper 90 with an extensive surface area near the disk surface 6 to minimize mechanical vibrations on the disk 12 as well as extensive mounting areas 130, 132 and 134 as shown in FIGS. 6 and 7. The enclosing wall 99 of the disk damper prevents particles from attaching onto the outlet side of the air filter, improving the efficiency of the hard disk drive at filtering contaminant particles 120 out of its air.

A voice coil motor 36 is mounted to the base 16 and includes at least one actuator arm for pivoting a head gimbal assembly to position a slider near a track on the rotating disk surface 6, all of which is affected by the airflow resulting from the configuration of air filter 110, the disk dampers 90, 92 and/or 94, the disk wall 82, and the rotating disk surfaces. The voice coil motor pivots about the actuator pivot 30, moving in response to electrical stimulus the voice coil 32 and its interaction with a fixed magnet assembly 34. A disk cover 18 is mounted upon the base to encapsulate all of the shown components except the control circuit 40, usually mounted on the opposite side of the disk base.

Figure 2:
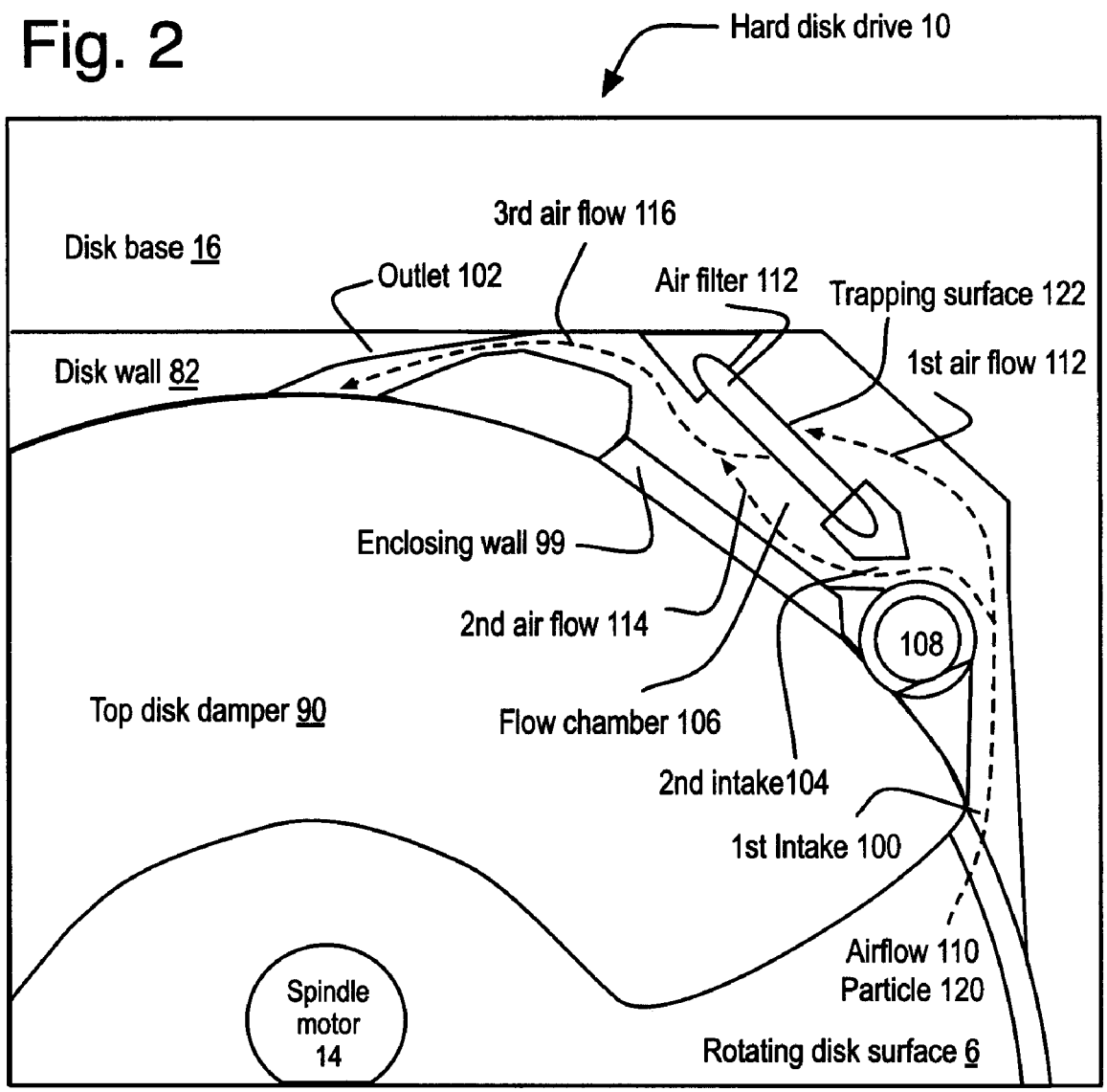
FIG. 2 shows some details of the hard disk drive of FIG. 1, with airflow entering the first intake to create a first airflow presented to the air filter, entering the second intake to create a second airflow into the flow chamber formed with the enclosing wall to create a suction by the second airflow through the air filter to create a negative pressure across the trapping surface of the air filter. The outlet creates a third airflow from the first air flow crossing the trapping surface and the second airflow crossing the flow chamber returning through the outlet to the hard disk drive. Particle contaminants may tend to accumulate on the trapping surface away from the outlet, thereby removing them from circulating in the air within the hard disk drive.

FIG. 2 shows the hard disk drive 10 of FIG. 1 filtering at least one particle 120 in its air at the trapping surface 122 in the air filter 110. The rotating disk surface 6 generates the airflow 110 entering into the first intake 100 to create the first airflow 112 presented to the air filter. The first airflow also enters the second intake 104 to create the second airflow 114. The flow chamber 106 is formed by the enclosing wall 99 creating suction by the second airflow through the air filter, attracting the first airflow to cross the trapping surface to accumulate particle contaminants 120 away from the enclosing wall and the outlet 102. The outlet creates the third airflow 116 from the first airflow crossing the trapping surface and the second airflow crossing the flow chamber to return the air to the hard disk drive without the trapped particle contaminants accumulated by the trapping surface.

Figure 3:
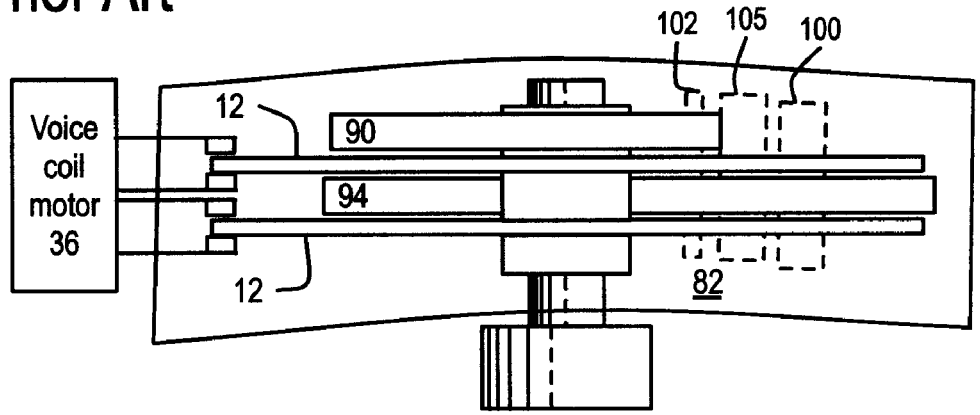
FIG. 3 shows an example of a hard disk drive of the prior art including a disk wall with two inlets and an outlet and using disk dampers with reduced mounting area for at least the top disk damper. Simulations have shown that this hard disk drive may provide less mechanical stability to the disks and is subject to poorer performance in trapping particles in the air than the embodiments of this hard disk drive.

FIG. 3 shows a simplified side cross section of an example of a prior art hard disk drive including a second inlet 105, as well as first intake 100 and outlet 102 with the top disk damper 90 having reduced mounting area. This configuration has been found by the inventors to have particles trapped on both sides of its air filter, reducing its effectiveness at removing particles from the air returned by its outlet to the hard disk drive.

Figure 4:
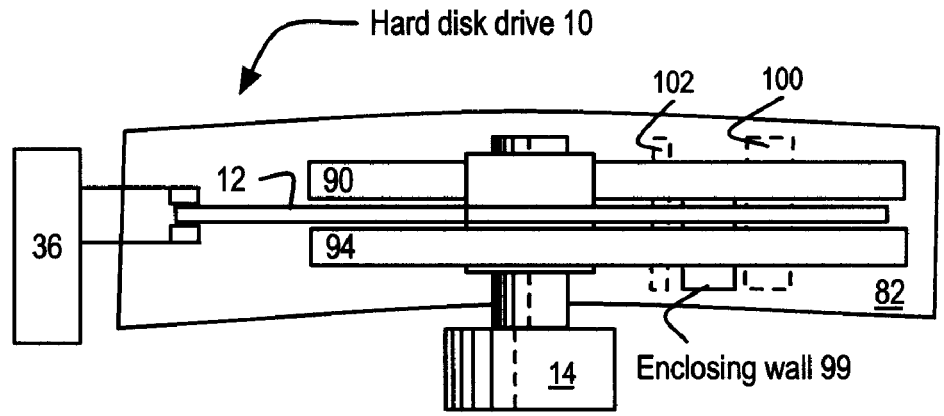
FIG. 4 shows a simplified side cross section of the hard disk drive of FIGS. 1 and 2 including a second disk damper near the disk and opposite the top disk damper, with the enclosing wall shown schematically extending beneath the second disk damper. In various embodiments of the invention, the enclosing wall may alternatively extend from the top disk damper to the second disk damper as shown in FIGS. 6 and 7.

FIG. 4 shows a simplified side cross section of the hard disk drive 10 of FIGS. 1 and 2 including a second disk damper 94 near the disk 12 and opposite the top disk damper 90, with the enclosing wall 99 shown schematically extending beneath the second disk damper. In various embodiments of the invention, the enclosing wall may alternatively extend from the top disk damper to the second disk damper as shown in FIGS. 6 and 7.

The enclosing wall 99 of at least one of the disk dampers 90, 92 and/or 94 allows more mounting area 130, 132 and/or 134 of the disk dampers standing on the disk base 16 to minimize tilting of disk damper towards the disks 12, resulting in improved shock performance in terms of disk to damper clearances. FIG. 6 shows an embodiment of the top disk damper including the enclosing wall with three mounting areas. And FIG. 7 shows an embodiment of the second or third disk damper without the enclosing wall but with the three mounting areas.

The hard disk drive 10 may include separable independent disk dampers 90 and 94, with the disk damper 94 separating the disk 12 from the disk base 16 and the other disk damper 90 being located above the disk. The hard disk drive may be assembled without an opening 105 in the vicinity of the air filter 110 to form a flow chamber 106 to ensure optimal pressure drop across the air filter.

Figure 5:
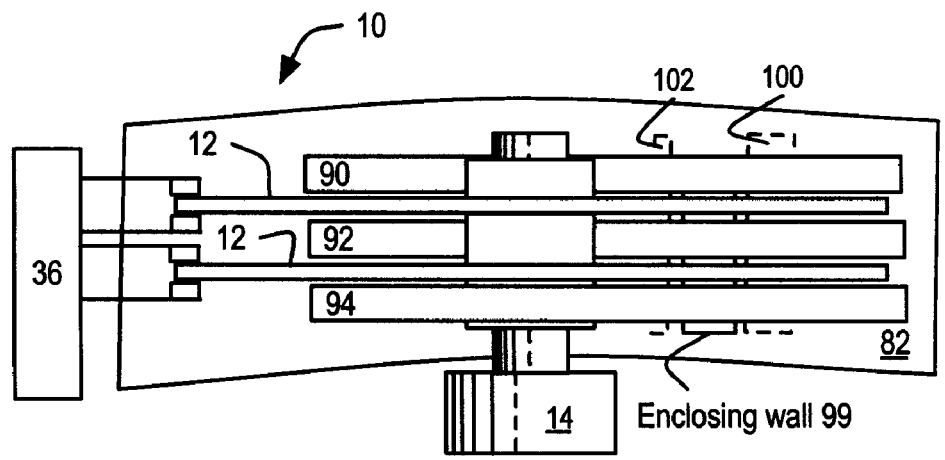
FIG. 5 shows a simplified cross section of the hard disk drive of FIGS. 1, 2 and 4 further including a third disk damper between the top disk damper and the second disk damper, with a second disk situated so that each rotating disk surface of the two disks is near a surface of one of the disk dampers.

FIG. 5 shows a simplified cross section of the hard disk drive 10 of FIGS. 1, 2 and 4 further including a third disk damper 92 between the top disk damper 90 and the second disk damper 94, with a second disk situated so that each rotating disk surface of the two disks is near a surface of one of the disk dampers 90, 92 or 94.

Embodiments of the hard disk drive 10 include at least one air filter 110 mounted on the disk wall 82 of the disk base 16 and the disk dampers with an enlarged mounting area towards the disk base 16, which improves both the air filter performance, disk dampening and mechanical shock performance of the hard disk drive. Such embodiments may have improved filtration performance with better damping effect on flow-induced vibration when compared to a hard disk drive where all the disk dampers have inlet against the air filter as shown in FIG. 3. In part this may be attributed to the enclosing wall forming the flow chamber 106 configured so that the second airflow 114 provides a suction across the air filter 110 making the trapped particles 112 accumulate away from the enclosing wall and unable to enter the outlet 102.

FIGS. 6 and 7 show embodiments of the disk dampers that may be used in the hard disk drive 10 of previous Figures. FIG. 6 shows an embodiment of the top disk damper 90 including the enclosing wall 99 with three mounting areas 130, 132 and 134. FIG. 7 shows an embodiment of the second disk damper 94 or third disk damper 92 without the enclosing wall but with the three mounting areas.

The preceding embodiments provide examples of the invention, and are not meant to constrain the scope of the following claims.

What is claimed is:
1. A hard disk drive, comprising:
a disk base with a disk wall including a first intake, a second intake off of said first intake, an outlet and an air filter configured to receive a first airflow from said first intake and suction created by a second airflow from said second intake to create a negative pressure across a trapping surface of said air filter opposite said outlet;
a spindle motor mounted on said disk base and coupled to at least one disk to create at least one rotating disk surface to generate an airflow configured to enter said first intake to create said first airflow;
a first disk damper mounted on said disk base near said disk and including an enclosing wall neighboring said air filter to encapsulate a flow chamber fed by said second airflow and said first airflow having crossed said trapping surface to create a third airflow through said outlet.

2. The hard disk drive of claim 1, further comprising a second disk damper near said disk away from said first disk damper.

3. The hard disk drive of claim 2, wherein said second disk damper is configured to fit with at least part of said enclosing wall.

4. The hard disk drive of claim 2, wherein said enclosing wall ends near said second disk damper.

5. A method, comprising the step of:
operating a hard disk drive, including a disk base with an air filter including a trapping surface and a disk damper with an enclosing wall to form a flow chamber configured to provide a negative pressure across said trapping surface, includes:
- rotating at least one disk by a spindle motor mounted on said disk base to create at least one rotating disk surface generating an airflow,
- entering by said airflow into a first intake in a disk wall of said disk base to create a first airflow presented to said trapping surface,
- entering by said airflow a second intake off of said first intake to create a second airflow into said flow chamber,
- forming said flow chamber with said enclosing wall to create a suction by said second airflow through said air filter to create said negative pressure on said trapping surface attracting said first airflow, and
- creating a third airflow in an outlet included in said disk base from said second airflow crossing said flow chamber and from said first airflow crossing said trapping surface to return said airflow to said hard disk drive.

6. The method of claim 5, wherein the step operating said hard disk drive further comprises the step of accumulating by said negative pressure across said trapping surface particle contaminants by said trapping surface away from said outlet.

* * * * *